(12) United States Patent
Shino

(10) Patent No.: US 10,304,415 B2
(45) Date of Patent: May 28, 2019

(54) IMAGE PROCESSING APPARATUS AND IMAGE PROCESSING METHOD

(71) Applicant: SONY CORPORATION, Tokyo (JP)

(72) Inventor: Toshiaki Shino, Tokyo (JP)

(73) Assignee: SONY CORPORATION, Tokyo (JP)

( * ) Notice: Subject to any disclaimer, the term of this patent is extended or adjusted under 35 U.S.C. 154(b) by 81 days.

(21) Appl. No.: 15/510,180

(22) PCT Filed: Sep. 14, 2015

(86) PCT No.: PCT/JP2015/075946
§ 371 (c)(1),
(2) Date: Mar. 9, 2017

(87) PCT Pub. No.: WO2016/047472
PCT Pub. Date: Mar. 31, 2016

(65) Prior Publication Data
US 2017/0309256 A1  Oct. 26, 2017

(30) Foreign Application Priority Data
Sep. 22, 2014 (JP) .................. 2014-192203

(51) Int. Cl.
G09G 5/36      (2006.01)
G06T 3/60      (2006.01)
G09G 5/399     (2006.01)
G09G 5/39      (2006.01)
G09G 5/391     (2006.01)

(52) U.S. Cl.
CPC ................. G09G 5/36 (2013.01); G06T 3/60 (2013.01); G09G 5/39 (2013.01); G09G 5/391 (2013.01); G09G 5/399 (2013.01); G09G 2340/0407 (2013.01); G09G 2340/0492 (2013.01); G09G 2360/122 (2013.01)

(58) Field of Classification Search
CPC ..... G06T 3/60; G09G 5/39; G09G 2340/0492
USPC .................................................. 345/619, 649
See application file for complete search history.

(56) References Cited

U.S. PATENT DOCUMENTS 7,307,635 B1* 12/2007 Yang .................... G09G 5/37
345/560
2006/0238541 A1* 10/2006 Toni .................... G06T 3/602
345/531
2010/0110230 A1* 5/2010 Lim ...................... G09G 5/393
348/231.99

FOREIGN PATENT DOCUMENTS

JP      05-128246 A    5/1993
JP      06-103373 A    4/1994
(Continued)

Primary Examiner — Jacinta M Crawford
(74) Attorney, Agent, or Firm — Chip Law Group

(57) ABSTRACT

The present technology relates to an image processing apparatus that reduces a memory capacity necessary for deformation processing of each frame image of a moving image. Pixel data of a first frame image being each frame image of an input moving image is written into a plurality of storage areas in a write-in order, and the pixel data of the written first frame image is read out in a read-out order, thereby generating a second frame image being the first frame image deformed. The write-in of the pixel data and the read-out of the pixel data are performed in parallel, the first frame image is divided into blocks in 2 rows×2 columns or more, the blocks are written into each of the storage area and the block to be written next is written into the storage area that becomes vacant by reading out the pixel data immediately before.

9 Claims, 20 Drawing Sheets

(56) References Cited

FOREIGN PATENT DOCUMENTS

| | | |
|---|---|---|
| JP | 07-146932 A | 6/1995 |
| JP | 2004-242212 A | 8/2004 |
| JP | 2005-102168 A | 4/2005 |
| JP | 2011-107965 | 6/2011 |

\* cited by examiner

|  | | Output | | | | | | | | |
|---|---|---|---|---|---|---|---|---|---|---|
|  | | 1 | 2 | 3 | 4 | ... | 70 | 71 | | |
| Input | 1 | 0 | 1 | 0 | 0 | 0 | 0 | ... | 0 | 0 |
|  | 2 | 1 | 0 | 1 | 0 | 0 | 0 | ... | 0 | 0 |
|  | 3 | 2 | 0 | 0 | 1 | 0 | 0 | ... | 0 | 0 |
|  | 4 | 3 | 0 | 0 | 0 | 1 | 0 | ... | 0 | 0 |
|  |   | 4 | 0 | 0 | 0 | 0 | 1 | ... | 0 | 0 |
|  | ... | ... | ... | ... | ... | ... | ... | ... | ... | ... |
|  |   | 70 | 0 | 0 | 0 | 0 | 0 | ... | 1 | 0 |
|  |   | 71 | 0 | 0 | 0 | 0 | 0 | ... | 0 | 1 |
|  | 1 |   | 0 | 1 | 0 | 0 | 0 | ... | 0 | 0 |
|  | 2 |   | 1 | X | 1 | 0 | 0 | ... | 0 | 0 |
|  | 3 |   | 2 | X | X | 1 | 0 | ... | 0 | 0 |
|  | 4 |   | 3 | X | X | X | 1 | 0 | ... | 0 | 0 |
|  |   | 4 | X | X | X | X | 1 | ... | 0 | 0 |
|  | ... | ... | ... | ... | ... | ... | ... | ... | ... | ... |
|  |   | 70 | X | X | X | X | X | ... | 1 | 0 |
|  |   | 71 | X | X | X | X | X | ... | X | 1 |

FIG.8

| RAM | Frame identification flag | Write-in ready | Block number |
|---|---|---|---|
| 1 | 1 | 0 | 1 |
| 2 | 1 | 0 | 2 |
| 3 | 1 | 0 | 3 |
| 4 | 1 | 0 | 4 |
| 5 | 1 | 0 | 5 |
| 6 | 1 | 0 | 6 |
| 7 | 1 | 0 | 7 |
| 8 | 1 | 0 | 8 |
| 9 | 1 | 0 | 9 |
| 10 | 1 | 0 | 10 |
| 11 | 1 | 0 | 11 |
| 12 | 1 | 0 | 12 |
| 13 | 1 | 0 | 13 |
| 14 | 1 | 0 | 14 |
| 15 | 1 | 0 | 15 |
| 16 | 1 | 0 | 16 |
| 17 | 1 | 0 | 17 |
| 18 | 1 | 0 | 18 |
| 19 | 1 | 0 | 19 |
| 20 | 1 | 0 | 20 |
| ... | | | |
| 53 | 1 | 0 | 53 |
| 54 | 1 | 0 | 54 |
| 55 | 1 | 0 | 55 |
| 56 | 1 | 0 | 56 |
| 57 | 1 | 0 | 57 |
| 58 | 1 | 0 | 58 |
| 59 | 1 | 0 | 59 |
| 60 | 1 | 0 | 60 |
| 61 | 1 | 0 | 61 |
| 62 | 1 | 0 | 62 |
| 63 | 1 | 0 | 63 |
| 64 | 1 | 0 | 64 |
| 65 | | 1 | |
| 66 | | 1 | |
| 67 | | 1 | |
| 68 | | 1 | |
| 69 | | 1 | |
| 70 | | 1 | |
| 71 | | 1 | |
| 72 | | 1 | |

FIG.11

|    | 544 |    |    |    |    |    |    |
|----|----|----|----|----|----|----|----|
| 57 | 49 | 41 | 33 | 25 | 17 | 9  | 1  |
| 58 | 50 | 42 | 34 | 26 | 18 | 10 | 2  |
| 59 | 51 | 43 | 35 | 27 | 19 | 11 | 3  |
| 60 | 52 | 44 | 36 | 28 | 20 | 12 | 4  |
| 61 | 53 | 45 | 37 | 29 | 21 | 13 | 5  |
| 62 | 54 | 46 | 38 | 30 | 22 | 14 | 6  |
| 63 | 55 | 47 | 39 | 31 | 23 | 15 | 7  |
| 64 | 56 | 48 | 40 | 32 | 24 | 16 | 8  |

| RAM | Frame identification flag | Write-in ready | Block number |
|---|---|---|---|
| 1 |  | 1 |  |
| 2 | 1 | 0 | 2 |
| 3 | 1 | 0 | 3 |
| 4 | 1 | 0 | 4 |
| 5 | 1 | 0 | 5 |
| 6 | 1 | 0 | 6 |
| 7 | 1 | 0 | 7 |
| 8 | 1 | 0 | 8 |
| 9 |  | 1 |  |
| 10 | 1 | 0 | 10 |
| 11 | 1 | 0 | 11 |
| 12 | 1 | 0 | 12 |
| 13 | 1 | 0 | 13 |
| 14 | 1 | 0 | 14 |
| 15 | 1 | 0 | 15 |
| 16 | 1 | 0 | 16 |
| 17 |  | 1 |  |
| 18 | 1 | 0 | 18 |
| 19 | 1 | 0 | 19 |
| 20 | 1 | 0 | 20 |
| ... | | | |
| 53 | 1 | 0 | 53 |
| 54 | 1 | 0 | 54 |
| 55 | 1 | 0 | 55 |
| 56 | 1 | 0 | 56 |
| 57 |  | 1 |  |
| 58 | 1 | 0 | 58 |
| 59 | 1 | 0 | 59 |
| 60 | 1 | 0 | 60 |
| 61 | 1 | 0 | 61 |
| 62 | 1 | 0 | 62 |
| 63 | 1 | 0 | 63 |
| 64 | 1 | 0 | 64 |
| 65 | 2 | 0 | 1 |
| 66 | 2 | 0 | 2 |
| 67 | 2 | 0 | 3 |
| 68 | 2 | 0 | 4 |
| 69 | 2 | 0 | 5 |
| 70 | 2 | 0 | 6 |
| 71 | 2 | 0 | 7 |
| 72 | 2 | 0 | 8 |

FIG.16

| RAM | Frame identification flag | Write-in ready | Block number |
|---|---|---|---|
| 1 | 2 | 0 | 9 |
| 2 |  | 1 |  |
| 3 | 1 | 0 | 3 |
| 4 | 1 | 0 | 4 |
| 5 | 1 | 0 | 5 |
| 6 | 1 | 0 | 6 |
| 7 | 1 | 0 | 7 |
| 8 | 1 | 0 | 8 |
| 9 | 2 | 0 | 10 |
| 10 |  | 1 |  |
| 11 | 1 | 0 | 11 |
| 12 | 1 | 0 | 12 |
| 13 | 1 | 0 | 13 |
| 14 | 1 | 0 | 14 |
| 15 | 1 | 0 | 15 |
| 16 | 1 | 0 | 16 |
| 17 | 2 | 0 | 11 |
| 18 |  | 1 |  |
| 19 | 1 | 0 | 19 |
| 20 | 1 | 0 | 20 |
| ⋮ |  |  |  |
| 53 | 1 | 0 | 53 |
| 54 | 1 | 0 | 54 |
| 55 | 1 | 0 | 55 |
| 56 | 1 | 0 | 56 |
| 57 | 2 | 0 | 16 |
| 58 |  | 1 |  |
| 59 | 1 | 0 | 59 |
| 60 | 1 | 0 | 60 |
| 61 | 1 | 0 | 61 |
| 62 | 1 | 0 | 62 |
| 63 | 1 | 0 | 63 |
| 64 | 1 | 0 | 64 |
| 65 | 2 | 0 | 1 |
| 66 | 2 | 0 | 2 |
| 67 | 2 | 0 | 3 |
| 68 | 2 | 0 | 4 |
| 69 | 2 | 0 | 5 |
| 70 | 2 | 0 | 6 |
| 71 | 2 | 0 | 7 |
| 72 | 2 | 0 | 8 |

FIG.17

| RAM | Frame identification flag | Write-in ready | Block number |
|---|---|---|---|
| 1 | 1 | 0 | 1 |
| 2 | 1 | 0 | 2 |
| 3 | 1 | 0 | 3 |
| 4 | 1 | 0 | 4 |
| 5 | 1 | 0 | 5 |
| 6 | 1 | 0 | 6 |
| 7 | 1 | 0 | 7 |
| 8 | 1 | 0 | 8 |
| 9 | | 1 | |
| 10 | | 1 | |
| 11 | | 1 | |
| 12 | | 1 | |
| 13 | | 1 | |
| 14 | | 1 | |
| 15 | | 1 | |
| 16 | | 1 | |

IMAGE PROCESSING APPARATUS AND IMAGE PROCESSING METHOD

CROSS REFERENCE TO RELATED APPLICATIONS

This application is a U.S. National Phase of International Patent Application No. PCT/JP2015/075946 filed on Sep. 14, 2015, which claims priority benefit of Japanese Patent Application No. JP 2014-192203 filed in the Japan Patent Office on Sep. 22, 2014. Each of the above-referenced applications is hereby incorporated herein by reference in its entirety.

TECHNICAL FIELD

The present technology relates to an image processing apparatus, an image processing method, and a program, and in particular to an image processing apparatus, an image processing method, and a program that are suitable when each frame image of a moving image is deformed.

BACKGROUND ART

In the related art, acceleration of rotation processing of each frame image of a moving image (hereinafter referred to as a frame image) and reduction of processing costs are studied (for example, see Patent Literatures 1, 2).

CITATION LIST

Patent Literature

Patent Literature 1: Japanese Patent Application Laid-open No. 2004-242212
Patent Literature 2: Japanese Patent Application Laid-open No. 2004-242212

DISCLOSURE OF INVENTION

Technical Problem

When each frame image of a moving image is rotated, all frame images for one frame are written into a memory, and pixel data is read out in an order different from a write-in order. Thus, each frame image is rotated. When the rotation processing is accelerated, the write-in processing and the read-out processing are executed in parallel.

On the other hand, upon the execution of the rotation processing, when the write-in processing and the read-out processing are executed in parallel, a memory capacity for storing the frame images for two frames, i.e., the frame image to be read-out and the frame image to be written is at least necessary. Accordingly, it is necessary that a large capacity memory be disposed on a chip such as an LSI for performing the rotation processing, and an external memory is connected, which leads to increased costs.

Then, the present technology is to reduce a memory capacity necessary for deformation processing such as rotation of each frame image of a moving image.

Solution to Problem

An image processing apparatus according to one aspect of the present technology includes a write-in control unit that writes pixel data of a first frame image being each frame image of an input moving image into a predetermined plurality of storage areas in a storage unit in a predetermined write-in order; and a read-out control unit that reads out in a predetermined read-out order the pixel data of the first frame image written into the storage unit and generates a second frame image being the first frame image deformed, the write-in control unit and the read-out control unit performing the write-in of the pixel data and the read-out of the pixel data in parallel, the write-in control unit dividing the first frame image into blocks in 2 rows×2 columns or more, writing the blocks into each of the storage area one by one, and writing the block to be written next into the storage area that becomes vacant by reading out the pixel data immediately before by the read-out control unit.

The write-in order is along a predetermined first direction of the first frame image, and the read-in order is along a second direction being the same as the first direction of the second frame image.

The write-in control unit writes the pixel data into the storage unit per N block units being two or more arranged in the first direction in the first frame image, the read-out control unit reads out the pixel data from the storage unit per M block units being two or more arranged in the second direction in the second frame image, and the write-in control unit writes the N blocks to be written next into the storage area that becomes vacant by reading out the pixel data by the read-out control unit every time N or more storage areas become vacant.

N=M is satisfied, and the write-in control unit writes the N blocks to be written next into the N storage areas that become vacant by reading out the N blocks immediately before by the read-out control unit.

The write-in control unit writes the N blocks arranged in a $j-1^{th}$ ($j=>2$) line in the first direction of the $i^{th}$ ($i=>2$) first frame image, and the read-out control unit reads out the N blocks arranged in a $j-1^{th}$ line in the second direction of the $i-1^{th}$ second frame image in parallel, and the write-in control unit writes the N blocks arranged in a $j^{th}$ line in the first direction of the $i^{th}$ first frame image into the storage area that becomes vacant by reading out the N blocks arranged in a $j-1^{th}$ line in the second direction of the $i-1^{th}$ second frame image by the read-out control unit.

The write-in control unit writes the pixel data into the storage unit per the N block units being two or more arranged in the first direction in the first frame image, the read-out control unit reads out the N blocks written into the storage unit by the write-in control unit immediately before, and the write-in control unit writes the N blocks to be written next into the N storage areas that become vacant by reading out the N blocks by the read-out control unit immediately before.

The write-in control unit writes the N blocks arranged in a $j-1^{th}$ ($j=>3$) line in the first direction of the $i^{th}$ ($i=>1$) first frame image, and the read-out control unit reads out the N blocks arranged in a $j-2^{th}$ line in the second direction of the $i^{th}$ second frame image in parallel, and the write-in control unit writes the N blocks arranged in a $j^{th}$ line in the first direction of the $i^{th}$ first frame image into the N storage areas that become vacant by reading out the N blocks arranged in a $j-2^{th}$ line in the second direction of the $i^{th}$ second frame image by the read-out control unit.

The deformation of the first frame image is at least one of rotation, reverse, enlargement, and reduction.

An image processing method according to one aspect of the present technology executed by an image processing apparatus that writes pixel data of a first frame image being each frame image of an input moving image into a predetermined plurality of storage areas in a storage unit in a predetermined write-in order, reads out in a predetermined read-out order the pixel data of the first frame image written into the storage unit, and generates a second frame image being the first frame image deformed, includes performing the write-in of the pixel data and the read-out of the pixel data in parallel; dividing the first frame image into blocks in 2 rows×2 columns or more; writing the blocks into each of the storage area one by one; and writing the block to be written next into the storage area that becomes vacant by reading out the pixel data immediately before.

In a program according to one aspect of the present technology for executing processing by a computer that writes pixel data of a first frame image being each frame image of an input moving image into a predetermined plurality of storage areas in a storage unit in a predetermined write-in order, reads out in a predetermined read-out order the pixel data of the first frame image written into the storage unit, and generates a second frame image being the first frame image deformed, the processing includes performing the write-in of the pixel data and the read-out of the pixel data in parallel; dividing the first frame image into blocks in 2 rows×2 columns or more; writing the blocks into each of the storage area one by one; and writing the block to be written next into the storage area that becomes vacant by reading out the pixel data immediately before.

According to one aspect of the present technology, the write-in of the pixel data and the read-out of the pixel data are performed in parallel, the first frame image is divided into blocks in 2 rows×2 columns or more, the blocks are written into each of the storage area one by one, and the block to be written next is written into the storage area that becomes vacant by reading out the pixel data immediately before.

Advantageous Effects of Invention

According to one aspect of the present technology, a memory capacity necessary for deformation processing such as rotation of each frame image of a moving image can be reduced.

It should be noted that the effect described here is not necessarily limitative and may be any effect described in the present disclosure.

BRIEF DESCRIPTION OF DRAWINGS

FIG. 8 is a table for showing an example of input and output properties of a priority encoder.

FIG. 11 is a drawing showing an example of a value of the tag resistor.

FIG. 14 is a drawing showing an example of a block arrangement of the output frame image.

FIG. 16 is a drawing showing an example of a value of the tag resistor.

FIG. 17 is a drawing showing an example of a value of the tag resistor.

MODES FOR CARRYING OUT THE INVENTION

Hereinafter, mode for carrying out the present disclosure (hereinafter referred to as embodiments) will be described. The description will be made in the following order.
1. Embodiment
2. Alternative Embodiment 1. Embodiment {Configuration Example of Image Processing Apparatus 1}

Figure 1:
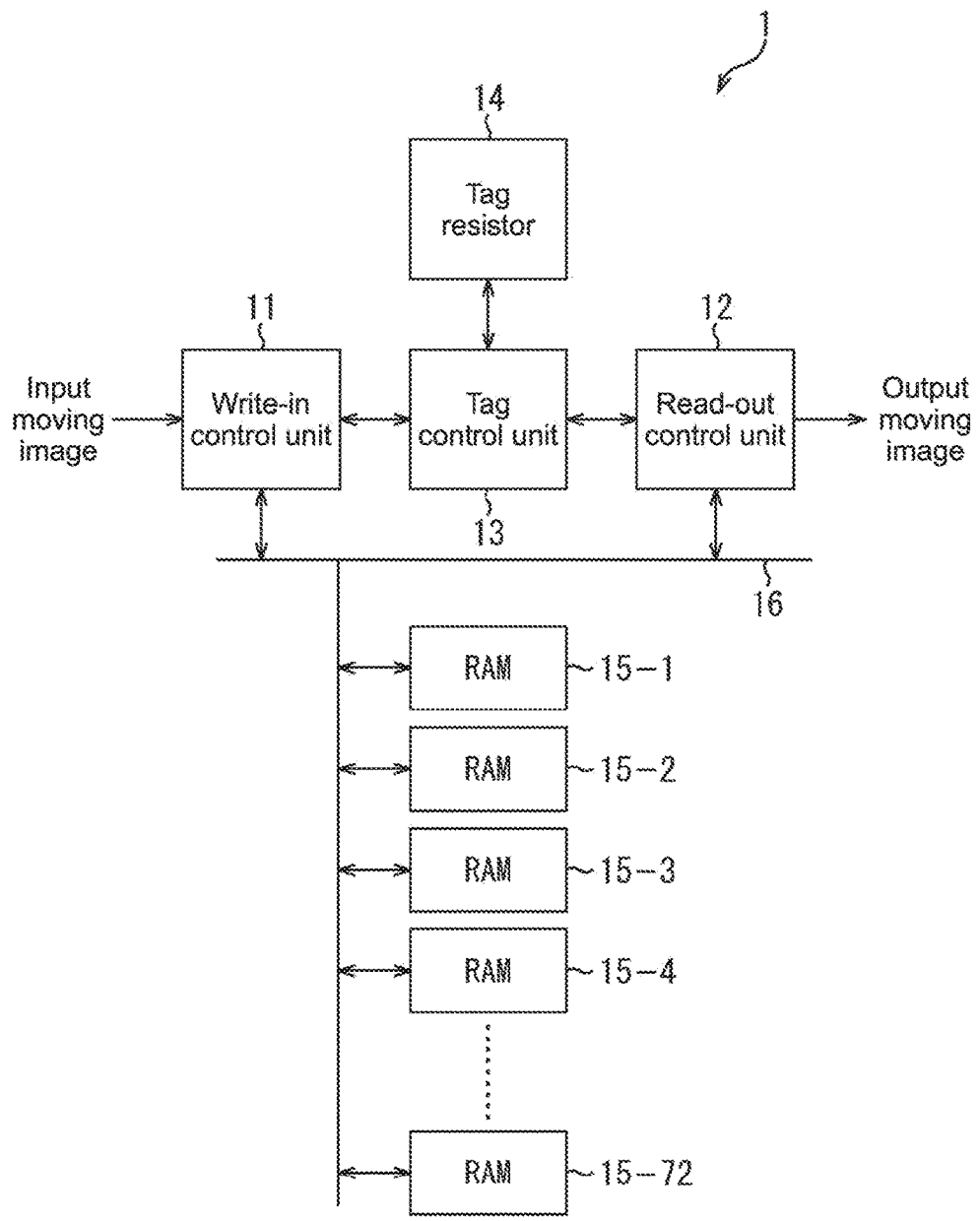
FIG. 1 is a block diagram showing an embodiment of an image processing apparatus to which the present technology is applied.

FIG. 1 shows a configuration example of an image processing apparatus 1 according to an embodiment of an image processing apparatus to which the present technology is applied.

The image processing apparatus 1 deforms each frame image of a moving image input externally (hereinafter referred to as an input moving image). Then, the image processing apparatus 1 outputs a moving image including each deformed frame image (hereinafter referred to as an output moving image). The deformation of the frame image performed by the image processing apparatus 1 includes rotation, reverse, enlargement, reduction, etc. of the frame image, for example.

Hereinafter, if the frame image of the input moving image is distinguished from the frame image of the output moving image, the former is referred to as an input frame image, and the latter is referred to as an output frame image.

The image processing apparatus 1 includes a write-in control unit 11, a read-out control unit 12, a tag control unit 13, a tag resistor 14, and a RAMS 15-1 to 15-72. The write-in control unit 11, the read-out control unit 12, and the RAMS 15-1 to 15-72 are mutually connected via a bus 16.

Hereinafter, if there is no need to distinguish the RAMS 15-1 to 15-72 individually, it is referred simply to as a RAM 15.

The write-in control unit 11 controls writing of each input frame image of the input moving image into the RAM 15. More specifically, the write-in control unit 11 divides each input frame image into a predetermined-size block, and writes it into each RAM 15 per block unit. In other words, the write-in control unit 11 controls such that each block of each input frame image is written into each RAM 15 one by one.

The read-out control unit 12 controls read-out of each output frame image of the output moving image from each RAM 15. Also, the read-out control unit 12 deforms the frame image by controlling a read-out order of pixel data of each block from each RAM 15. Then, the read-out control unit 12 outputs the output moving image including the deformed frame image.

Tag control unit 13 updates the tag resistor 14 in conjunction with the write-in of the frame image by the write-in control unit 11, and the read-out of the frame image by the read-out control unit 12. Also, the tag control unit 13 notifies a content of the tag resistor 14 of the write-in control unit 11 and the read-out control unit 12.

One tag resistor 14 is provided for each RAM 15, and shows the status of each RAM 15 as described later referring to FIG. 2.

The RAMS 15-1 to 15-72 each is a storage area into which the block of each input frame image is written.

Note that the RAMS 15-1 to 15-72 may be realized by dividing one or more RAM areas into a plurality of small areas, of may be realized with respective physically different RAMS.

Hereinafter, 1 to 72 identification numbers are assigned to the RAMS 15-1 to 15-72, respectively. For example, the number 1 is assigned to the RAM 15-1, and the number 72 is assigned to the RAM 15-72.

{Example of Dividing Method of Frame Image}

Figure 2:
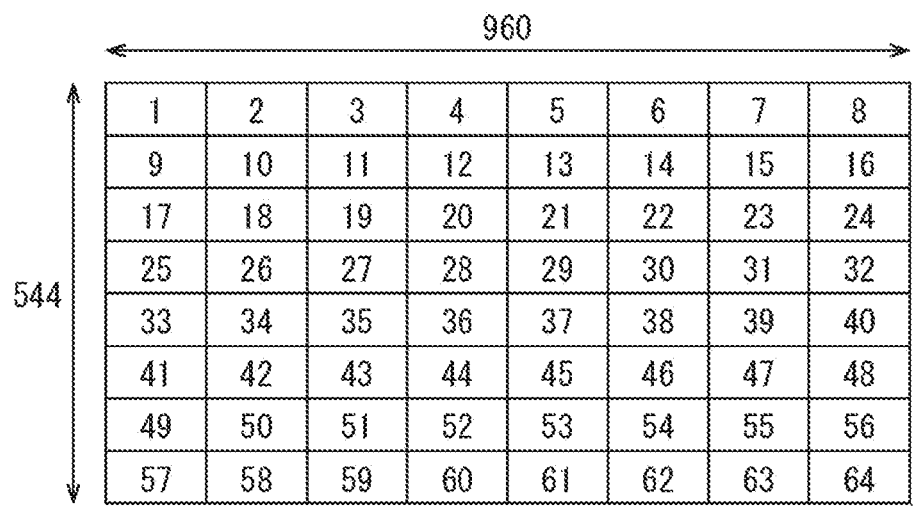
FIG. 2 is a diagram showing an example of a method of dividing a frame image.

FIG. 2 shows an example of a dividing method of the frame image. In the frame image, pixels are arranged in 544 lines×960 columns. The frame image is divided into 64 rectangular blocks having the same size in 8 lines×8 columns.

As shown in FIG. 2, the processing of dividing the frame image will be described below as a specific example. At a top left corner block, a block number 1 is assigned. Subsequently, block numbers are assigned to respective blocks in the order from a left to right direction and an up to down direction. Furthermore, a left end block of the blocks in each row is a head block, and a right end block is an end block in each row. For example, at a 1st row of the frame image in FIG. 2, a left end block 1 is the head block, and a right end block 8 is the end block.

{Configuration Example of Tag Resistor 14}

Figure 3:
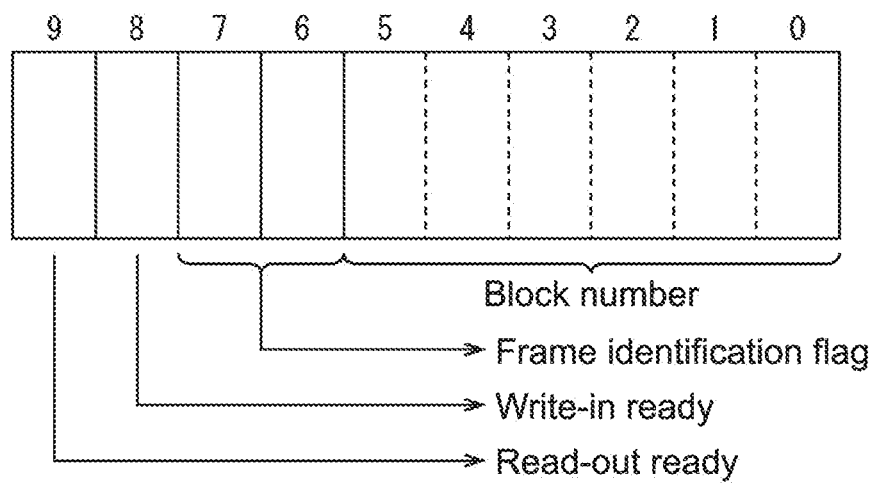
FIG. 3 is a drawing showing a configuration example of a tag resistor.

FIG. 3 shows a configuration example of a tag resistor 14. The tag resistor 14 is a 10-bit resistor, and is provided per RAM 15, as described above.

The block numbers of the blocks of the input frame image written into the target RAM 15 are set at from $0^{th}$ to $5^{th}$ bits of the tag resistor 14.

At from $6^{th}$ to $7^{th}$ bits of the tag resistor 14, a 1 or 2 frame identification flag is set. Into the respective RAMS 15, the blocks of the successive two input frame images are written at the same time. Therefore, by the frame identification flag, the input frame image to which each block belongs is identified.

At $8^{th}$ bit of the tag resistor 14, a write-in ready that is a flag showing whether or not the corresponding RAM 15 is writable. For example, when the corresponding RAM 15 is unwritable, the write-in ready is set to 0, and when the corresponding RAM 15 can be written-in, the write-in ready is set to 1.

At $9^{th}$ bit of the tag resistor 14, a read-out ready that is a flag showing whether or not the corresponding RAM 15 is readable. For example, when the corresponding RAM 15 is unreadable, the read-out ready is set to 0, and when the corresponding RAM 15 can be read-out, the read-out ready is set to 1.

{Image Rotation Processing}

Figure 5:
FIG. 5 is a drawing showing an example of an input frame image.
Figure 6:
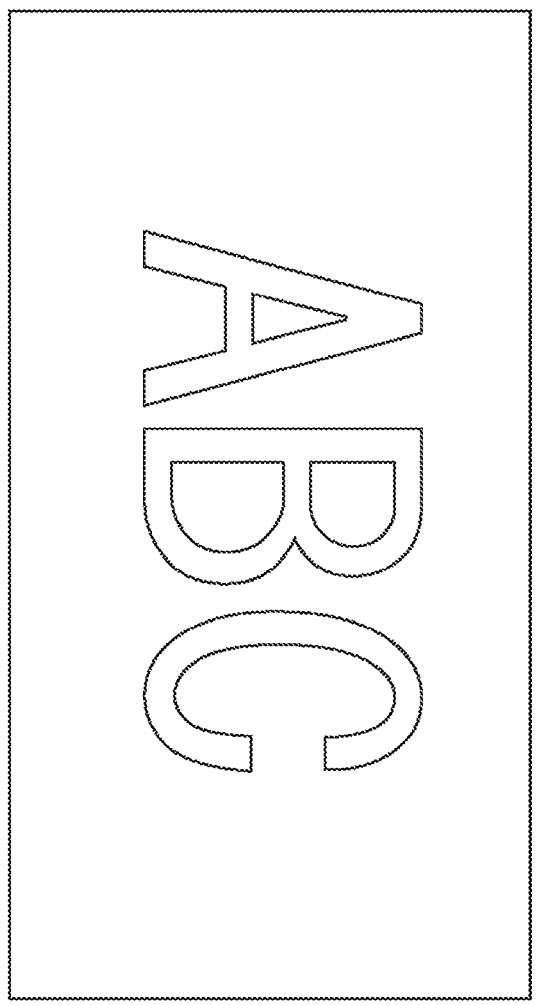
FIG. 6 is a drawing showing an example of an output frame image.

Next, referring to a flow chart in FIG. 4, image rotation processing executed by the image processing apparatus 1 will be described. By the processing, each frame image of the input moving image is output by rotating 90 degrees in a right direction. For example, the frame image shown in FIG. 5 is output by rotating 90 degrees in a right direction as shown in FIG. 6.

In Step S1, the write-in control unit 11 and the read-out control unit 12 substitute 1 into a variable i.

In Step S2, the write-in control unit 11 executes the write-in processing. Here, referring to a flow chart in FIG. 7, the write-in processing will be described in detail.

In Step S51, the write-in control unit 11 substitutes 1 into a variable j.

In Step S52, the write-in control unit 11 writes a $j^{th}$ row block of a 1st input frame image. In this instance, as a value of the variable j is set to 1, blocks 1 to 8 at the 1st row of the input frame image are written into the RAM 15.

Specifically, the write-in control unit 11 firstly determines a write-in position of the head block 1 at the 1st row of the 1st input frame image. Here, the write-in control unit 11 includes a 72-bit priority encoder having input and output properties shown in FIG. 8. The sections shown by x in the input and output properties table in FIG. 8 represent that x may be 0 or 1.

The priority encoder outputs data showing a position of the lowest bit among input 72-bit data having an input data value of 1 bit. For example, when data is input where the lowest 0 bit is set to 1, the priority encoder outputs data where only 0 bit is set to 1 irrespective of the values from 1 bit to 72 bit. In addition, for example, when data is input where the lowest 0 bit is set to 0 and 1st bit is set to 1, the priority encoder outputs data where only 1 bit is set to 1 irrespective of the values from 2 bit to 71 bit.

For example, the write-in control unit 11 reads out a value of the write-in ready of the tag resistor 14 in each RAM 15 via the tag control unit 13. Then, the write-in control unit 11 inputs 72-bit data including the value of the write-in ready of the tag resistor 14 in each RAM 15 into the priority encoder.

In the input data, the values of the write-in ready of in the respective RAMS 15 are, for example, arranged from a lower bit to an upper bit in order of the lower number of the RAM 15. For example, the value of write-in ready in the RAM 15-1 is set to 0 bit of the input data, the value of write-in ready in the RAM 15-2 is set to 1 bit of the input data, and the value of write-in ready in the RAM 15-72 is set to 71 bit of the input data.

Then, the write-in control unit 11 determines the RAM 15 corresponding to the bit where the value is set to 1 in the data output from the priority encoder to the write-in position of the block 1. In this way, the RAM 15 having the lower number among the writable RAMS 15 is determined to be in the write-in position of the block 1. In this instance, as no block is written into any RAM 15, the RAM 15-1 is determined to be in the write-in position of the block 1.

Figure 9:
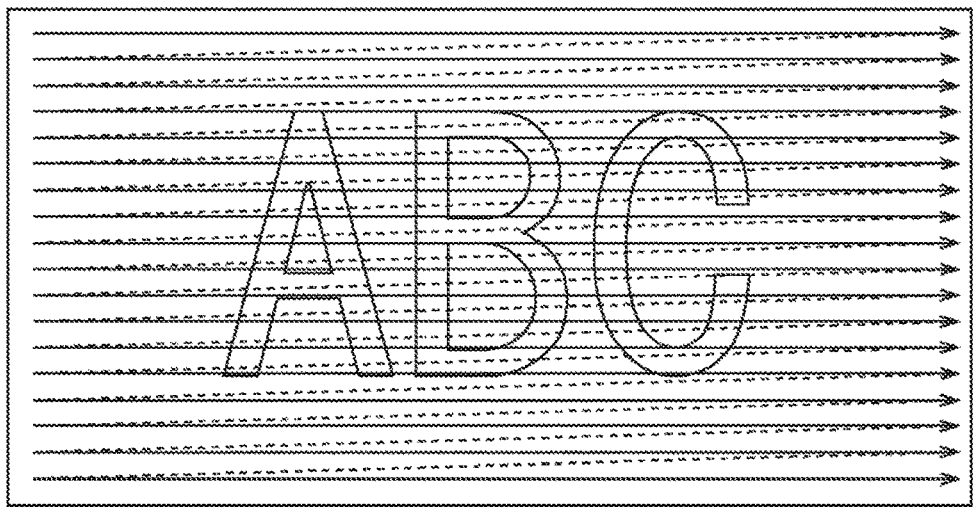
FIG. 9 is a drawing showing an example of a write-in order of pixel data of the input frame image.

Next, the write-in control unit 11 writes pixel data of the block 1 into the RAM 15-1. Here, as shown in FIG. 9, each pixel data of the input frame image is scanned in a raster order from left to right from the uppermost row, and is written into the RAM 15. Then, the write-in control unit 11 firstly writes the pixel data at the 1st row of the block 1 into the RAM 15-1.

Next, the write-in control unit 11 determines the write-in position of the block 2 to be in the RAM 15-2 in a similar way as the block 1. Then, the write-in control unit 11 writes the pixel data at the 1st row of the block 2 into the RAM 15-2.

In the similar manner, the write-in control unit 11 determines the write-in positions of the blocks 3 to 8 to the RAMS 15-3 to 15-8, and writes the pixel data at the 1st row of the blocks 2 to 8 into the RAMS 15-3 to 15-8.

Next, the write-in control unit 11 writes the pixel data at the second row of the blocks 1 to 8 into the RAMS 15-1 to 15-8.

In the similar manner, the write-in control unit 11 writes the pixel data at the 3rd row to the $68^{th}$ row of the blocks 1 to 8 into the RAMS 15-1 to 15-8.

Figure 10:
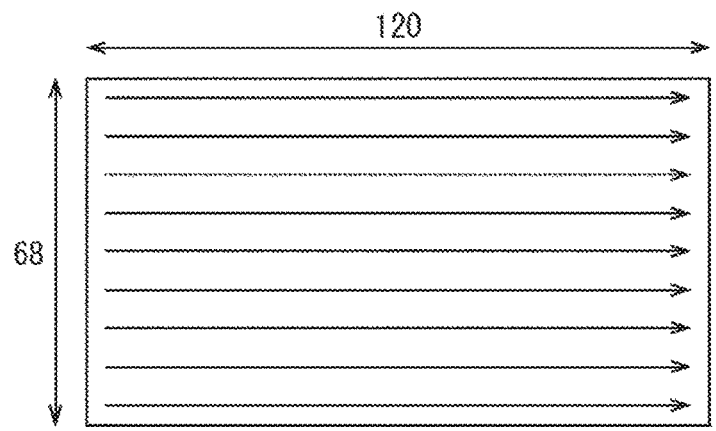
FIG. 10 is a drawing showing an example of a write-in order of pixel data within a block.

In this way, as shown in FIG. 10, the pixel data of the blocks 1 to 8 is separately written into the RAMS 15-1 to 15-8 in a raster order. A size of one block will be 68 lines×120 columns.

Then, the write-in control unit 11 notifies of the tag control unit 13 a write-in completion of the blocks 1 to 8 of the 1st input frame image. The tag control unit 13 updates the value of the tag resistor 14 of the RAMS 15-1 to 15-8 into which the blocks 1 to 8 are written.

Returning to FIG. 7, in Step S53, the write-in control unit 11 increments the value of the variable j by 1.

In Step S54, the write-in control unit 11 determines whether or not the variable j is greater than a constant N. The constant N is a row number of the block in the input frame image. In this instance, it is set to 8. Then, when the variable j is determined to be no greater than the constant N, i.e., when writing the all row blocks of the 1st input frame image is not yet ended, the processing returns to Step S52.

Thereafter, in Step S54, until the variable j is determined to be greater than the constant N, the processing in Steps S52 to S54 are executed repeatedly. In this manner, the blocks of the 1st input frame image are written into the RAMS 15-1 to 15-64 per eight arranged in a row direction. In addition, the value of the tag resistor 14 of the RAMS 15-1 to 15-64 into which the blocks 1 to 64 are written is updated.

FIG. 11 shows an example of the value of the tag resistor 14 of each RAM 15 after writing the 1st input frame image is ended. In this instance, the value of the write-in ready is not shown.

For example, the block numbers of the tag resistor 14 of the RAMS 15-1 to 15-64 into which the blocks are written is set to 1 to 64. The written ready is set to 0 representing unwritable. The frame identification flag is set to 1.

On the other hand, the block numbers of the tag resistor 14 of the RAMS 15-64 to 15-72 into which no block is written is set to an initial value (for example, 0). The written ready is set to 1 representing writable. The frame identification flag is set to an initial value (for example, 0).

On the other hand, in Step S54, when the variable j is determined to greater than the constant N, i.e., when writing the all row blocks of the 1st input frame image is ended, the write-in processing is ended.

Returning to FIG. 4, in Step S3, the write-in control unit 11 determines whether or not next input frame image is present. When non-processed input frame image is present, the next input frame image is determined to be present, and the processing proceeds to Step S4.

In Step S4, the write-in control unit 11 and the read-out control unit 12 increment the value of the variable i by 1.

In Step S5, the image processing apparatus 1 executes read-out and write-in processing. Here, referring to a flow chart in FIG. 12, the read-out and write-in processing will be described in detail.

In Step S101, the write-in control unit 11 and the read-out control unit 12 substitute 1 to the variable j.

Figure 7:
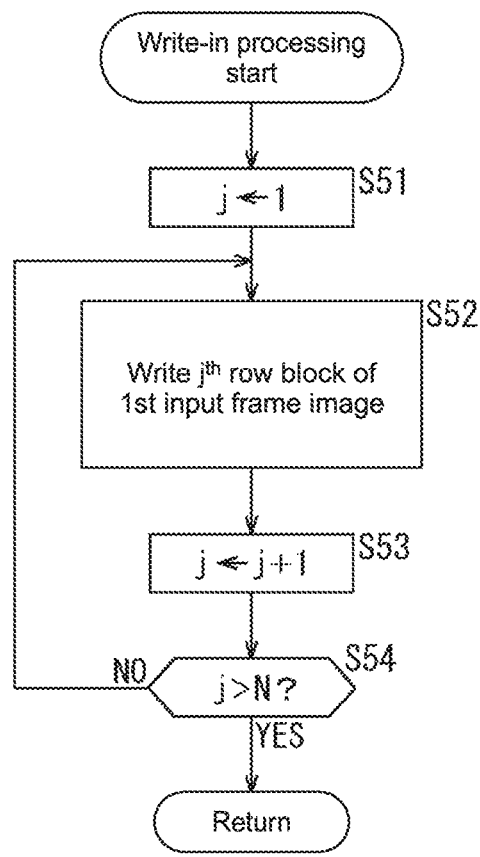
FIG. 7 is a flow chart for describing a detail of write-in processing.

In Step S102, the write-in control unit 11 writes the $j^{th}$ row block of the $i^{th}$ input frame image by the processing similar to Step S52 in FIG. 7. For example, in the first processing in Step S102, blocks 1 to 8 of the 1st row of the 2nd input frame image are written into the RAMS 15-65 to 15-72. In addition, the value of the tag resistor 14 of the RAMS 15-65 to 15-72 into which the blocks 1 to 8 are written is updated.

In Step S103, the read-out control unit 12 reads out $j^{th}$ row block of the $i-1^{th}$ output frame image. For example, in first processing of Step S103, 1st row blocks of the 1st output frame image are read out. Here, the processing of reading out the 1st row block of the 1st output frame image will be described specifically.

Figure 13:
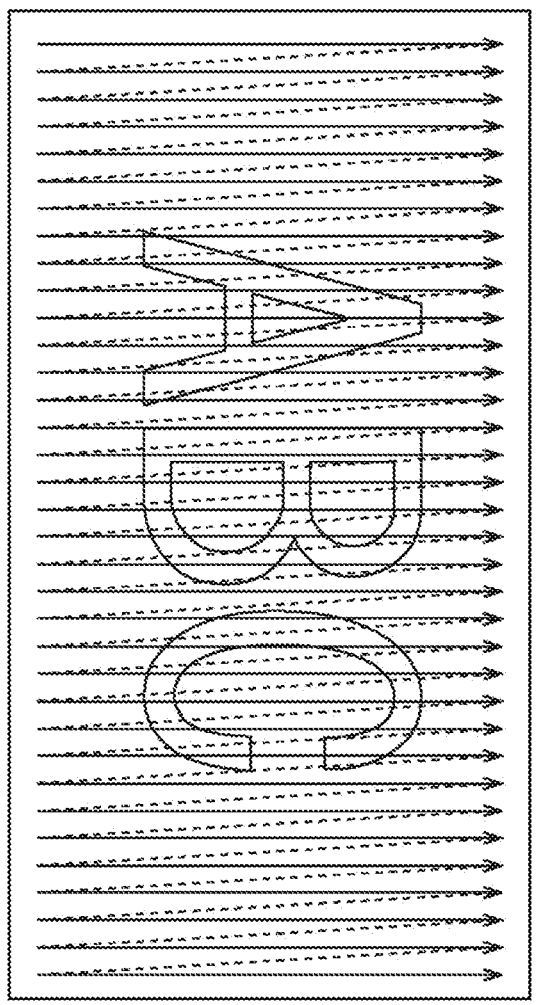
FIG. 13 is a drawing showing an example of a read-out order of the output frame image.

For example, when the input frame image is input, and is written into the RAM 15 shown in FIG. 9, the read-out control unit 12 reads out in a raster order each pixel data of the output frame image in FIG. 13 that is the frame image in FIG. 9 rotated 90 degrees in a right direction.

FIG. 14 shows a block arrangement of the output frame image in FIG. 13. As shown in the figure, the 1st row blocks of the output frame image are blocks 57, 49, 41, 33, 25, 17, 9, 1 from left, and the pixel data in each block is read out in this order.

Firstly, the read-out control unit 12 requests a search of the write-in position of the block 57 for the tag control unit 13. The tag control unit 13 searches the write-in position of the block 57 using the tag resistor 14, and notifies the searched result of the read-out control unit 12. As shown in FIG. 11 described above, the block 57 is written into the RAM 15-57, and the tag control unit 13 notifies the RAM 15-57 of the read-out control unit 12 as a search result.

Figure 15:
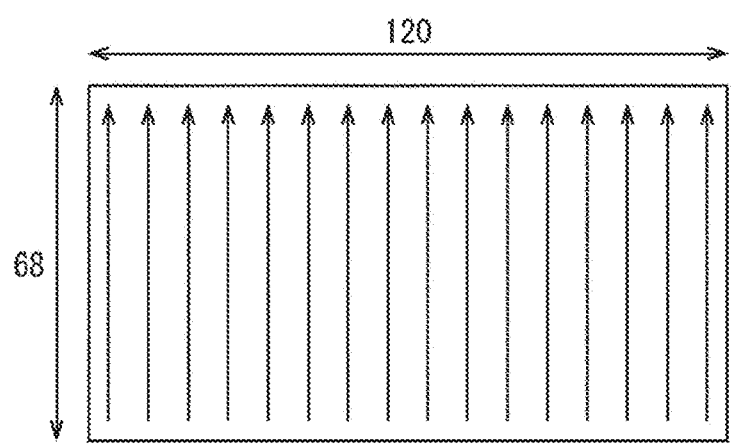
FIG. 15 is a drawing showing an example of a read-out order of pixel data within a block.

Then, the read-out control unit 12 reads out 1st row pixel data of the block 57 in the output frame image from the RAM 15-57. Here, as shown in FIG. 13, the order of reading out the pixel data of the output frame image is different from the order of writing the pixel data of the input frame image in FIG. 9. Accordingly, the order of reading out the pixel data of each block is different from the order of writing. Specifically, as shown in FIG. 15, the pixel data is read out from a down to up direction in the order from a left end column of the block.

Accordingly, firstly, the read-out control unit 12 reads out the pixel data in a first left end column of the block 57 from the RAM 15-57 in the down to up direction, and outputs it externally.

Next, the read-out control unit 12 acquires the write-in position of the block 49 (RAM 15-49) from the tag control unit 13 in a way similar to the block 57. Then, the read-out control unit 12 reads out and outputs externally pixel data at a left end 1st column of the block 49 from a down to up direction from the RAM 15-49.

In the similar manner, the read-out control unit 12 reads out and outputs in order pixel data at a left end 1st column of the blocks 41, 33, 25, 17, 9, 1 from the down to up direction from the RAMS 15-41, 15-33, 15-25, 15-17, 15-9, 15-1.

Next, the read-out control unit 12 reads out and outputs in order pixel data at a 2nd column of the blocks 57, 49, 41, 33, 25, 17, 9, 1 from the down to up direction from the RAMS 15-57, 15-49, 15-41, 15-33, 15-25, 15-17, 15-9, 15-1.

In the similar manner, the read-out control unit 12 reads out and outputs in order pixel data from 3rd column to $120^{th}$ column of the blocks 57, 49, 41, 33, 25, 17, 9, 1 from the down to up direction from the RAMS 15-57, 15-49, 15-41, 15-33, 15-25, 15-17, 15-9, 15-1.

In this way, the pixel data from the 1st row to $120^{th}$ row of the output frame image shown in FIG. 13 is read out in a raster order.

Then, the read-out control unit 12 notifies of the tag control unit 13 a read-out completion of the blocks 57, 49, 41, 33, 25, 17, 9, 1 of the 1st output frame image. The tag control unit 13 updates the value of the tag resistor 14 of the RAMS 15-57, 15-49, 15-41, 15-33, 15-25, 15-17, 15-9, 15-1 into which the blocks 57, 49, 41, 33, 25, 17, 9, 1 are written.

FIG. 16 shows an example of the value of the tag resistor 14 of each RAM 15 after writing the first block of the 2nd input frame image into the RAM 15 and reading out the 1st output frame image from the RAM 15. In this instance, the value of the write-in ready is not shown.

Comparing FIG. 16 with FIG. 11, the value of the tag resistor 14 of the RAMS 15-65 to 15-72 into which 1st row blocks 1 to 8 of the 2nd input frame image is changed. Specifically, the block number is set to 1 to 8. The write-in ready is set to 0 representing unwritable. The frame identification flag is set to 2 to distinguish from the block of the 1st input frame image.

Also, the value of the tag resistor 14 of the RAMS 15-57, 15-49, 15-41, 15-33, 15-25, 15-17, 15-9, 15-1 from which the 1st row blocks 57, 49, 41, 33, 25, 17, 9, 1 of the 1st output frame image are read out is changed. Specifically, the block number and the identification flag are reset and set to initial values. The write-in ready is set to 1 representing writable.

Note that processing in Step S102 and Step S103 are executed in parallel. However, the processing in Step S102 and Step S103 is not necessarily performed exactly at the same time. For example, there may be a time difference between a start timing and an end timing of the processing in Step S102 and the processing in Step S103.

After the processing in Steps S102 and S103 is ended, the processing proceeds to Step S104.

In Step S104, the write-in control unit 11 and the read-out control unit 12 increment a value of the variable j by 1.

In Step S105, similar to the processing in Step S54 in FIG. 7, it determines whether or not the variable j is greater than the constant N. When the variable j is determined to be no greater than the constant N, i.e., when writing the all row blocks of the 2nd input frame image and the read-out of the all row blocks of the 1st output image are not yet ended, the processing returns to Step S102 and Step S103.

Thereafter, in Step S105, until the variable j is determined to be greater than the constant N, the processing in Steps S102 to S105 are executed repeatedly.

For example, in the second processing in Steps S102 and S103, the blocks 9 to 16 in the 2nd row of the 2nd input frame image are written into the RAM 15, and the blocks 58, 50, 42, 34, 26, 18, 10, 2 of the 2nd row of the 1st output frame image are read out from the RAM 15. In this instance, the blocks 9 to 16 of the 2nd row of the 2nd input frame image are written into the RAMS 15-1, 15-9, 15-17, 15-25, 15-33, 15-41, 15-49, 15-57 that become vacant by reading out the 1st blocks of the 1st output frame image immediately before (in the processing in the previous Step S103).

FIG. 17 shows an example of the value of the tag resistor 14 of each RAM 15 after the 2nd row blocks of the 2nd input frame image are written into the RAM 15, and the 2nd blocks of the 1st output frame image are read out from the RAM 15. Note that in this instance, the value of the read-out ready is not shown.

Comparing FIG. 17 with FIG. 16, the value of the tag resistor 14 of the RAMS 15-1, 15-9, 15-17, 15-25, 15-33, 15-41, 15-49, 15-57 into which 2nd row blocks 9 to 16 of the 2nd input frame image is changed. Specifically, the block number is set to 9 to 16. The write-in ready is set to 0 representing unwritable. The frame identification flag is set to 2 to distinguish from the block of the 1st input frame image.

Also, the value of the tag resistor 14 of the RAMS 15-58, 15-50, 15-42, 15-34, 15-26, 15-18, 15-10, 15-2 from which the 2nd row blocks 58, 50, 42, 34, 26, 18, 10, 2 of the 1st output frame image are read out is changed. Specifically, the block number and the identification flag are reset and set to initial values. The write-in ready is set to 1 representing writable.

In the same manner, the blocks 3 to 8 of the input frame image in the 2nd frame are written into the RAM 15, and the blocks 3 to 8 of the 1st output frame image are read out. Note that the $j^{th}$ row block of the 2nd input frame image is written into the RAM that becomes vacant by reading out a $j-1^{th}$ block of the 1st output frame image (in the processing in the previous Step S103).

On the other hand, in Step S105, when the variable j is determined to be greater than the constant N, i.e., when writing the all row blocks of the 2nd input frame image is ended and when reading out the all row blocks of the 1st output frame image is ended, the read-out and write-in processing is ended.

Returning to FIG. 4, after the read-out and write-in processing, the processing returns to Step S3. Thereafter, until it is determined that next input frame is not present in Step S3, the processing in Steps S3 to S5 are executed repeatedly.

In this manner, processing for reading out the output frame image from the RAM 15 per eight blocks arranged in the row direction that is the previous one from the input frame image being written, while writing the input frame images are written in a frame order into the RAM 15 one by one per eight blocks arranged in a row direction, is executed repeatedly. Also, the $j^{th}$ row block of the $i^{th}$ input frame image is written into the vacant RAM 15 by reading out the $j-1^{th}$ block of the $i-1^{th}$ output frame image immediately before (or the $N^{th}$ row block of the $i-2^{th}$ output frame image).

On the other hand, in Step S3, when the last input frame image of the input moving image is written into the RAM 15, it is determined that next input frame image is not present, and the processing proceeds to Step S6.

Figure 18:
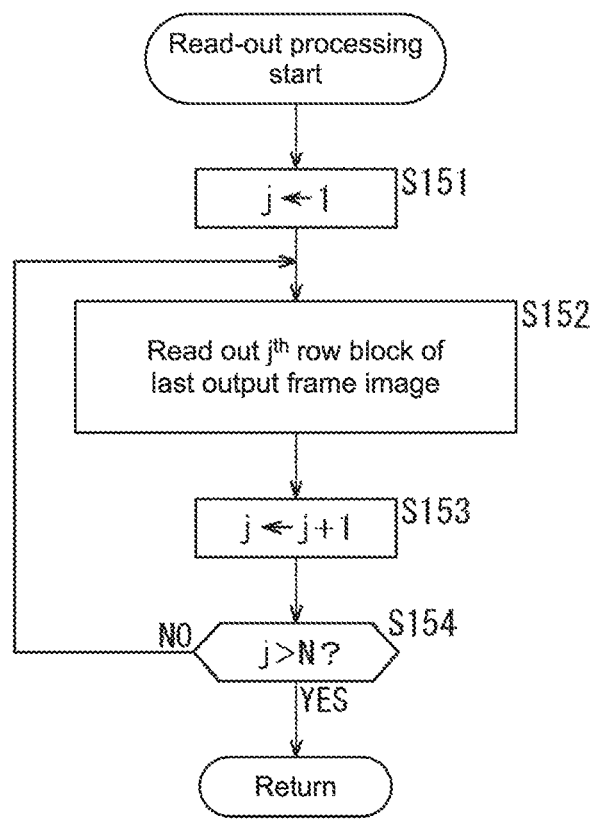
FIG. 18 is a flow chart for describing a detail of read-out processing.

In Step S6, the read-out control unit 12 performs the read-out processing, and the image rotation processing is ended. Here, referring to a flow chart in FIG. 18, the read-out processing will be described in detail.

In Step S151, the read-out control unit 12 substitutes 1 into the variable j.

Figure 12:
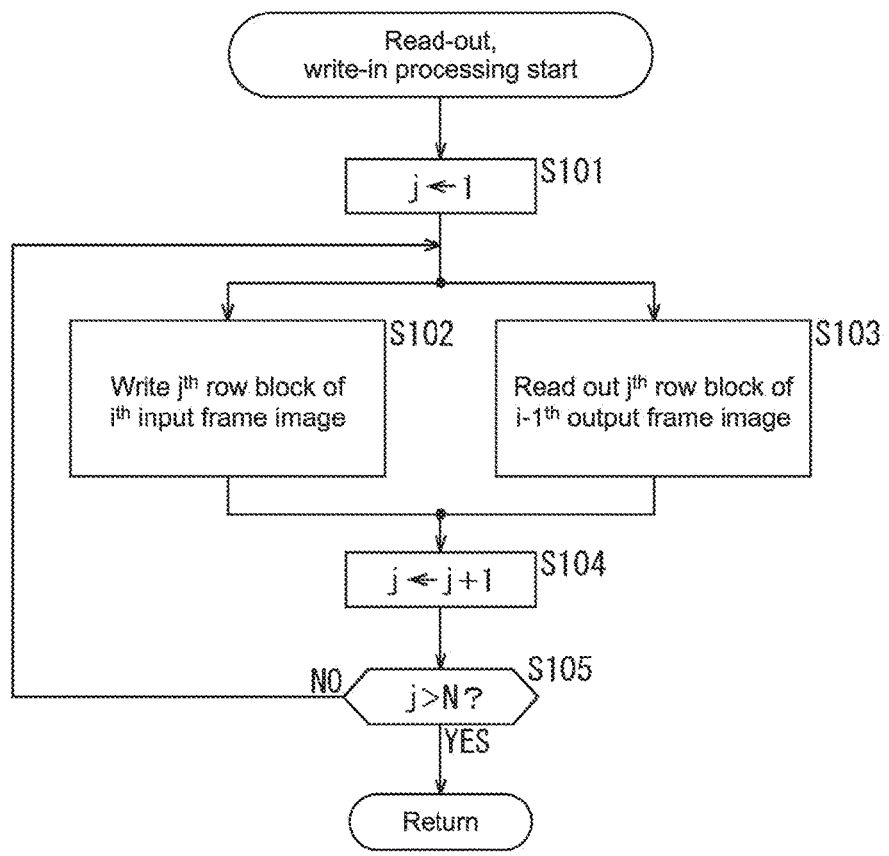
FIG. 12 is a flow chart for describing a detail of read-out and write-in processing.

In Step S152, similar to the processing in Step S103 in FIG. 12 as described above, the $j^{th}$ row block of the last output frame image is read out.

In Step S153, the read-out control unit 12 increments the value of the variable j.

In Step S154, similar to the processing in Step S54 in FIG. 7 as described above, it is determined whether or not the variable j is greater than the constant N. When the variable j is determined to be no greater than the constant N, the processing returns to Step S152.

Thereafter, in Step S154, until the variable j is determined to be greater than the constant N, the processing in Steps S152 to S154 is executed repeatedly. In this manner, each row block in the last output frame image is read out from the RAM 15 and is output.

On the other hand, in Step S154, when the variable j is determined to be greater than the constant N, the read-out processing is ended, and the image rotation processing is ended.

As described above, a capacity of the RAM 15 used when each frame image of the moving image is rotated can be reduced. Specifically, a necessary memory capacity can be reduced to the capacity that total 72 blocks including frame images for one frame and blocks for one row of pixel data can be written. In addition, as the write-in processing and the read-out processing of the frame image are executed in parallel, even if a used memory capacity is reduced, a decrease in a processing speed of the rotation processing can be inhibited.

By changing the read-out order of the pixel data, the frame image can be rotated 180 degrees, or rotated 90 degrees in a left direction. Similarly, by changing the read-out order of the frame image, the frame image can be inverted right and left or up and down. Any image deformation processing can be realized by the memory capacity that can write frame images for one frame and pixel data for one row block. Note that when the frame image is inverted right and left, the memory capacity can be further reduced, as described later.

{Image Enlargement/Reduction Processing}

Next, referring to flow charts in FIG. 19 and FIG. 20, image enlargement/reduction processing executed by the image processing apparatus 1 will be described. In the processing, each frame image of the input moving image is output in an enlarged or reduced size.

Hereinbelow, in order to highlight a reduction effect of the memory capacity, it illustrates that only the RAMS 15-1 to 15-16 among the RAMS 15-1 to 15-72 are used.

In Step S201, the write-in control unit 11 and the read-out control unit 12 substitute 1 into the variable i and variable j.

In Step S202, by the processing similar to Step S52 in FIG. 7 as described above, a 1st row block of the 1st input frame image is written.

Figures 21, 22:
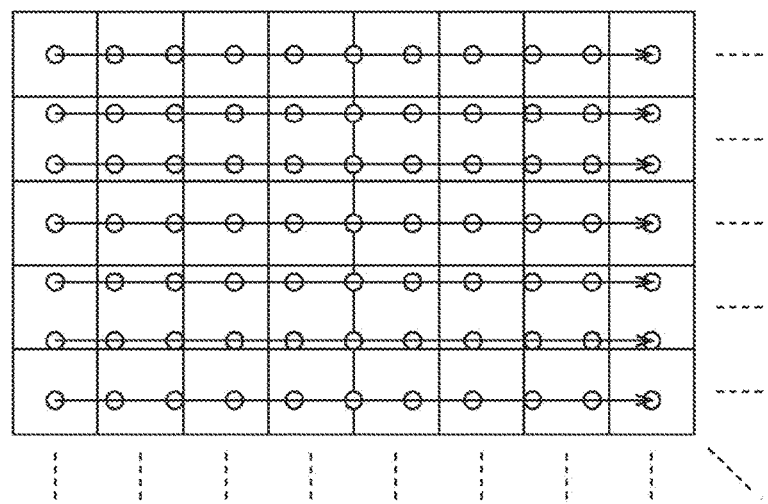
FIG. 21 is a drawing showing an example of a value of the tag resistor.
FIG. 22 is a drawing showing an example of a read-out order of the pixel data upon enlargement of the frame image.

FIG. 21 shows an example of a value of the tag resistor 14 of each RAM 15 after the 1st row block of the 1st input frame image is written. In this instance, the value of the write-in ready is not shown.

For example, the block numbers of the tag resistor 14 of the RAMS 15-1 to 15-8 into which the blocks are written are set to 1 to 8. The written ready is set to 0 representing unwritable. The frame identification flag is set to 1.

On the other hand, the block numbers of the tag resistor 14 of the RAMS 15-9 to 15-16 into which no block is written are set to initial values. The written ready is set to 1 representing writable. The frame identification flag is set to an initial value.

In Step S203, the value of the variable j is incremented by 1.

In Step S204, similar to the processing in Step S54 in FIG. 7 as described above, it determines whether or not the variable j is greater than the constant N. When the variable j is determined to be no greater than the constant N, the processing proceeds to Steps S205 and S206.

In Step S205, similar to the processing in Step S102 in FIG. 12 as described above, the $j^{th}$ row block of the $i^{th}$ input frame image is written. For example, in the first processing in Step S205, the blocks 8 to 16 in the 2nd row of the 1st input frame image are written into the RAMS 15-9 to 15-16.

In Step S206, the read-out control unit 12 reads out the $j-1^{th}$ row block of the $i^{th}$ output frame image. For example, in first processing of Step S206, the 1st row block of the 1st output frame image is read out.

Here, referring to FIGS. 22 and 23, the processing in Step S206 will be described in detail. Note that each square represents a pixel of the input frame image, and each circle represents a reading out position (sample position) of each pixel data of the output frame image in FIG. 22 and FIG. 23.

Upon the enlargement and the reduction of the frame image, each pixel data is read out basically in the same order as the writing. Accordingly, the 1st blocks of the 1st output frame image are read out in the order of blocks 1, 2, 3, 4, 5, 6, 7, 8 from the RAMS 15-1, 15-2, 15-3, 15-4, 15-15, 15-6, 15-7, 15-8. In addition, 1st row pixel data of the blocks 1 to 8 is read out from a left-to-right direction, 2nd row pixel data of the blocks 1 to 8 is read out from the left-to-right direction, and similarly thereafter 3rd to 68th rows pixel data of the blocks 1 to 8 are read out from the left-to-right direction.

Note that as shown in FIG. 22, upon the enlargement of the frame image, especially when no filtering processing is performed, numbers of the pixels increase according to an enlargement factor, and the pixel data read out a plurality of times is therefore present. In the example in FIG. 22, the pixel data at the 2nd column in the 1st row is read out twice, and the pixel data at the 2nd column in the 2st row is read out four times.

Figures 23, 24:
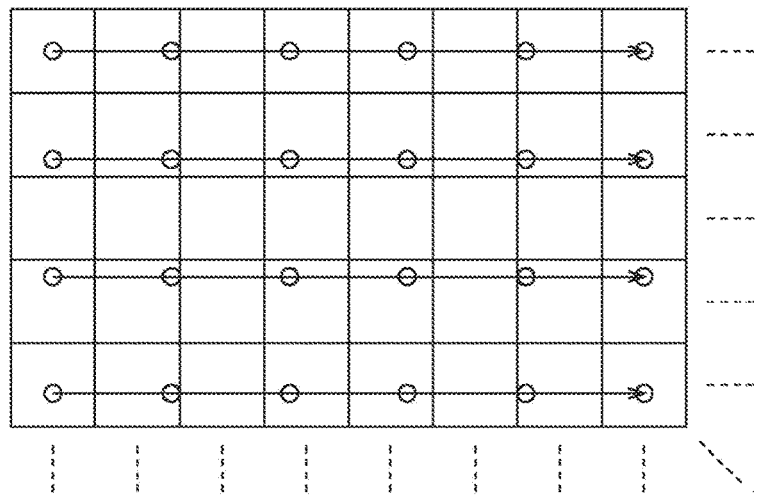
FIG. 23 is a drawing showing an example of a read-out order of the pixel data upon reduction of the frame image.
FIG. 24 is a drawing showing an example of a value of the tag resistor.

On the other hand, as shown in FIG. 23, upon the reduction of the frame image, especially when no filtering processing is performed, the pixel data is thinned according to a reduction factor, and the pixel data that is not read out is therefore present. In the example in FIG. 23, the pixel data at the 3nd column or the 3rd row is not read out.

Note that overlapping and thinning of the reading out position of the pixel data do not affect the write-in position of the pixel data.

FIG. 24 shows an example of the value of the tag resistor 14 of each RAM 15 after the 2nd row blocks of the 1st input frame image are written into the RAM 15, and the 1st blocks of the 1st output frame image are read out from the RAM 15. Note that in this instance, the value of the read-out ready is not shown.

Comparing FIG. 24 with FIG. 21, the value of the tag resistor 14 of the RAMS 15-9 to 15-16 into which the 2nd row blocks 9 to 16 of the 1st input frame image is changed. Specifically, the block number is set to 9 to 16. The write-in ready is set to 0 representing unwritable. The frame identification flag is set to 1.

Also, the value of the tag resistor 14 of the RAMS 15-1 to 15-8 from which the 1st row blocks 1 to 8 of the 1st output frame image are read out is changed. Specifically, the block number and the identification flag are reset and set to initial values. The write-in ready is set to 1 representing writable.

Note that processing in Step S205 and Step S206 are executed in parallel. However, the processing in Step S205 and Step S206 is not necessarily performed exactly at the same time. For example, there may be a time difference between a start timing and an end timing of the processing in Step S205 and the processing in Step S206.

After the processing in Step S205 and S206 is ended, the processing proceeds to Step S203.

Thereafter, in Step S204, until the variable j is determined to be greater than the constant N, the processing in Steps S203 to S206 are executed repeatedly.

In this manner, processing for reading out the $j-1^{th}$ row block of the 1st output frame image, while writing the $j^{th}$ row block of the 1st input frame image into the RAM 15, is repeated until the $N^{th}$ row (eighth row) block of the 1st input frame image is read out, and the $N-1^{th}$ row (seventh row) block of the 1st output frame image is read out. Also, the $j^{th}$ row block of the 1st input frame image is written into the vacant RAM 15 by reading out the $j-2^{th}$ block of the 1st output frame image immediately before (in the processing in the previous Step S206).

On the other hand, in Step S204, when the variable j is determined to be greater than the constant N, the processing proceeds to Step S207.

Figure 4:
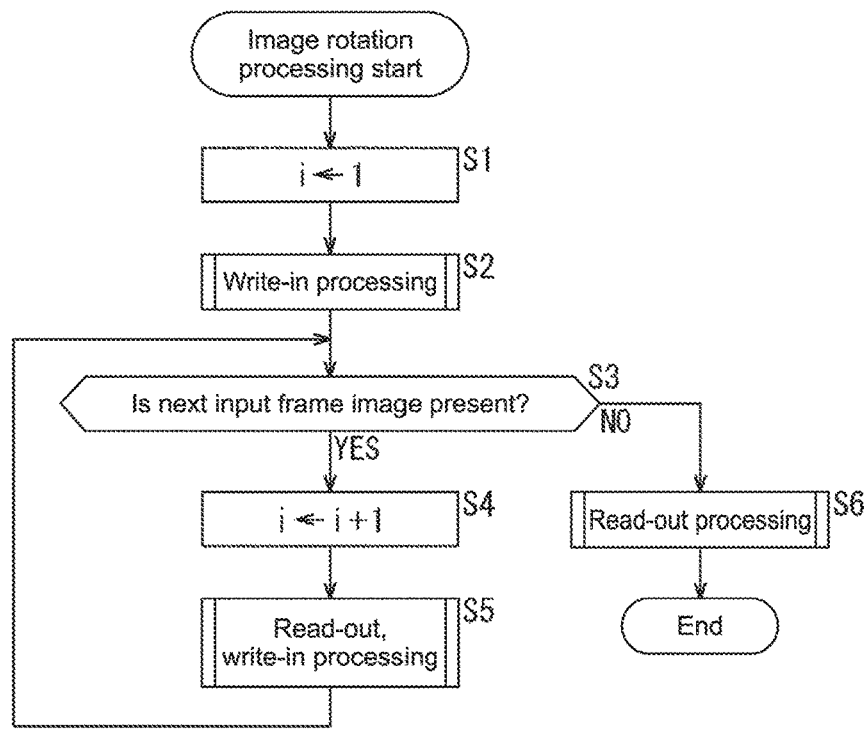
FIG. 4 is a flow chart for describing image rotation processing.

In Step S207, similar to the processing in Step S3 in FIG. 4 as described above, it determines whether or not next input frame image is present. When the next input frame image is determined to be present, the processing proceeds to Step S208.

In Step S208, the write-in control unit 11 and the read-out control unit 12 increment the value of the variable i by 1, and substitute 1 into the variable J.

In Step S209, similar to the processing in Step S52 in FIG. 7 as described above, the 1st row block of the $i^{th}$ input frame image is written. For example, in first processing of Step S209, the 1st row blocks 1 to 8 of the 2nd input frame image is written into the RAM 15.

In Step S210, similar to the processing in Step S206 as described above, the $N^{th}$ row block of the $i-1^{th}$ output frame image is written. For example, in first processing of Step S210, the $N^{th}$ row (eighth row) blocks 57 to 64 of the 1st output frame image is read out from the RAM 15.

Note that processing in Step S209 and Step S210 are executed in parallel. However, the processing in Step S209 and Step S210 is not necessarily performed exactly at the same time. For example, there may be a time difference between a start timing and an end timing of the processing in Step S209 and the processing in Step S210.

After the processing in Step S209 and S210 is ended, the processing returns to Step S203.

Thereafter, in Step S207, until it is determined that next input frame is not present, the processing in Steps S203 to S210 are executed repeatedly.

In this manner, processing for reading out the $j-1^{th}$ row block of the $i^{th}$ output frame image (or the $N^{th}$ row of the $i-1^{th}$ output frame image), while writing the $j^{th}$ row block of the i input frame image into the RAM 15, is executed repeatedly. Accordingly, while the blocks of each input frame image is written into the RAM 15 per eight blocks arranged in the row direction, the eight blocks written in directly before are read out from the RAM 15. Also, the $j^{th}$ row block of the $i^{th}$ input frame image is written into the vacant RAM 15 by reading out the $j-2^{th}$ block of the $i^{th}$ output frame image (or the $N^{th}$ row block of the $i-1^{th}$ output frame image) immediately before.

On the other hand, in Step S207, when the next input frame image is determined to be not present, the processing proceeds to Step S211.

In Step S211, similar to the processing in Step S206 as described above, the $N^{th}$ row block of the last output frame image is read out.

Thereafter, the image enlargement/reduction processing is ended.

As described above, a capacity of the RAM 15 used when each frame image of the moving image is enlarged or reduced can be reduced. Specifically, a necessary memory capacity can be reduced to the capacity that 16 blocks pixel data including the frame image for two rows can be written. In addition, as the write-in processing and the read-out processing of the frame image are executed in parallel, even if a used memory capacity is reduced, a decrease in a processing speed of the enlargement or reduction processing can be inhibited.

Figure 19:
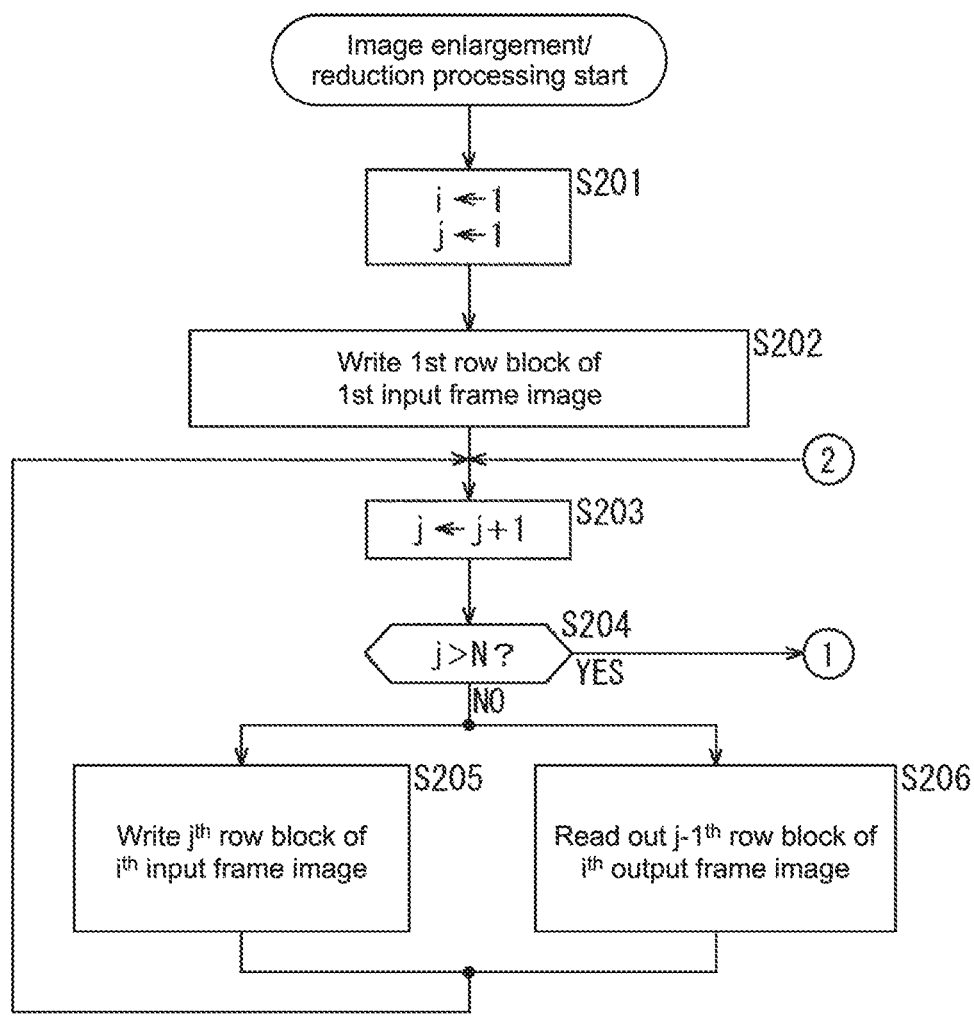
FIG. 19 is a flow chart for describing image enlargement/reduction processing.
Figure 20:
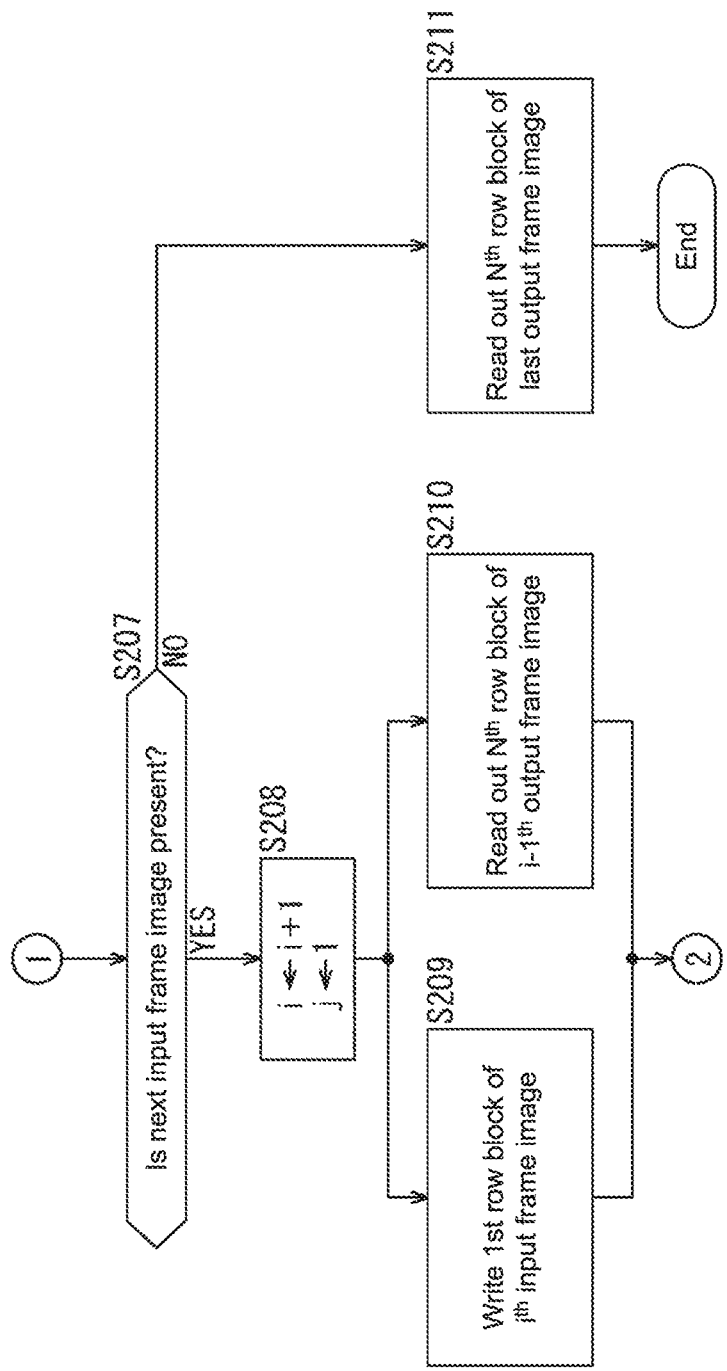
FIG. 20 is a flow chart for describing image enlargement/reduction processing.

The processing in FIG. 19 and FIG. 20 may be applied when deformation processing where a write-in direction of the pixel data of the input frame image is matched with a read-out direction of the pixel data of the output frame image is performed. Also, the processing in FIG. 19 and FIG. 20 may be applied when deformation processing where the write-in direction of the pixel data of the input frame image and the read-out direction of the pixel data of the output frame image are inverted is performed. For example, the former corresponds to the enlargement or reduction of the frame image described above, and the latter corresponds to the right and left inversion processing of the frame image.

2. Deformation Example

Hereinafter, deformation examples of the embodiments of the present technology described above will be described.
{Deformation Example Relating to Write-in Order and Read-in Order of Pixel Data}

In the above description, although it illustrates that the pixel data of the input frame image is written in the raster order, and the pixel data of the output frame image is read out in the raster order, the present technology is applicable to other write-in order and read-out order. For example, the present technology is applicable to the case that the write-in order and the read-out order of the pixel data can be set from a right to left direction of the row of the pixel data or an up to down direction of the frame image.

Also, the direction of the write-in order in the input frame image is not necessarily matched with the direction of the read-out order of the output frame image. For example, it is possible that the pixel data of the input frame image is written in the raster order, and the pixel data of the output frame image is read out from the up to down direction of the column.
{Deformation Example Relating to Dividing Method of Frame Image}

The dividing method of the frame image shown in FIG. 2 is illustrative, and it is possible to divide into any number of blocks with 2 lines×2 columns or more.

In addition, the brock number N in the row direction is not necessarily matched with the block number M in the column direction. However, when the brock number N in the row direction is different from the bock number M in the column direction, a unit number of the block to be written may not be matched with a unit number of the block to be read. For example, as described above, when the frame image is rotated 90 degrees in the right direction, the pixel data is written in N block units and the pixel data is read out in M block units.

Here, for example, when N>M and M blocks for one row in the output frame image is only read out, the RAM 15 cannot become vacant enough for writing N blocks for one row in the input frame image. Then, for example, until N or more numbers of the RAMS 15 become vacant, the blocks in a plurality of rows in the output frame image are read out, and every N or more numbers of the RAMS 15 become vacant, N numbers of the blocks of the input frame image may be written into the RAMS 15.

{Applicability of Present Technology}

The present technology is applicable to a variety of apparatuses and systems where the frame image of the moving image is deformed. The systems and the apparatuses may be single. Alternatively, they may be components within the apparatus such as LSI, or may be systems including a plurality of apparatuses.

{Configuration Example of Computer}

The above-described series of processing may be executed by hardware or software. When the series or processing is executed by software, a program configuring the software is installed in a computer. Here, the computer includes a computer that is built in dedicated hardware, a multi-purpose personal computer that can execute a variety of functions by installing a variety of programs, etc.

Figure 25:
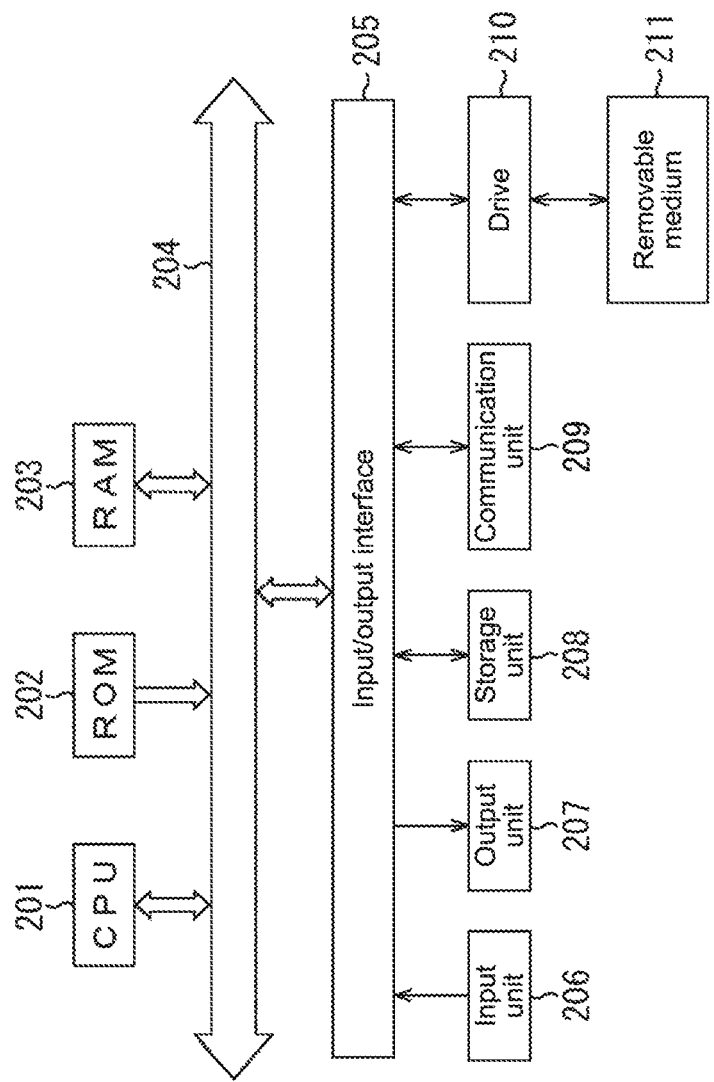
FIG. 25 is a block diagram showing a configuration example of a computer.

FIG. 25 is a block diagram showing a configuration example of hardware of a computer that executes the above-described series of processing by a program.

In the computer, a CPU (Central Processing Unit) 201, a ROM (Read Only Memory) 202, and a RAM (Random Access Memory) 203 are mutually connected via a bus 204.

To the bus 204, an input/output interface 205 is further connected. To the input/output interface 205, an input unit 206, an output unit 207, a storage unit 208, a communication unit 209, and a drive 210 are connected.

The input unit 206 is configured of a keyboard, a mouse, a microphone, etc. The output unit 207 is configured of a display, a speaker, etc. The storage unit 208 is configured of a hard disk, a non-volatile memory, etc. The communication unit 209 is configured of a network interface, etc. The drive 210 drives a removal medium 211 such as a magnetic disc, an optical disc, a magneto-optical disc, and a semiconductor memory.

In the computer configured as described above, when the CPU 201 loads a program stored in the storage unit 208 to the RAM 203 and executes via the input/output interface 205 and the bus 204, the above-described series of processing is performed.

The program executed by the computer (CPU 201) can be provided by recording the program to the removal medium 211 as a package medium, for example. The program can be provided via a wired or wireless transmission medium such as a local area network, the Internet, and digital satellite broadcasting.

In the computer, the program can be installed to the storage unit 208 via the input/output interface 205 by mounting the removal medium 211 to the drive 210. Also, the program can be received at the communication unit 209 via the wired or wireless transmission medium, and installed to the storage unit 208. Otherwise, the program can be installed to the ROM 202 or the storage unit 208 in advance.

The program executed by the computer may be processed in time series along the order described in the present specification, or may be processed in parallel or at a necessary timing upon invoking.

In the present specification, the system means a set of a plurality of components (apparatus, module (part) etc.). It does not matter whether or not all components are included in a same housing. Accordingly, a plurality of apparatuses housed in separate housings and connected via a network, and one apparatus that a plurality of modules are housed in one housing are both the system.

The embodiment of the present technology is not limited to the above-described embodiments, and variations and modifications may be made without departing from the scope of the present technology.

For example, the present technology may be configured of a cloud computing where one function is shared by a plurality of apparatuses via a network, and processed in cooperation.

Each step described in the above-described flow charts may be executed by one apparatus, or may be executed shared by a plurality of apparatuses.

When a plurality of processing are included in one Step, the plurality of processing included in one Step may be executed by one apparatus, or may be executed shared by a plurality of apparatuses.

Effects described herein are not limited only to be illustrative, there may be effects other than those described herein.

The present disclosure may also have the following configurations.

(1) An image processing apparatus, including:

a write-in control unit that writes pixel data of a first frame image being each frame image of an input moving image into a predetermined plurality of storage areas in a storage unit in a predetermined write-in order; and a read-out control unit that reads out in a predetermined read-out order the pixel data of the first frame image written into the storage unit and generates a second frame image being the first frame image deformed, the write-in control unit and the read-out control unit performing the write-in of the pixel data and the read-out of the pixel data in parallel, the write-in control unit dividing the first frame image into blocks in 2 rows×2 columns or more, writing the blocks into each of the storage area one by one, and writing the block to be written next into the storage area that becomes vacant by reading out the pixel data immediately before by the read-out control unit.

(2) The image processing apparatus according to (1) above, in which the write-in order is along a predetermined first direction of the first frame image, and the read-in order is along a second direction being the same as the first direction of the second frame image.

(3) The image processing apparatus according to (2) above, in which the write-in control unit writes the pixel data into the storage unit per N block units being two or more arranged in the first direction in the first frame image, the read-out control unit reads out the pixel data from the storage unit per M block units being two or more arranged in the second direction in the second frame image, and the write-in control unit writes the N blocks to be written next into the storage area that becomes vacant by reading out the pixel data by the read-out control unit every time N or more storage areas become vacant.

(4) The image processing apparatus according to (3) above, in which

N=M is satisfied, and the write-in control unit writes the N blocks to be written next into the N storage areas that become vacant by reading out the N blocks immediately before by the read-out control unit.

(5) The image processing apparatus according to (4) above, in which the write-in control unit writes the N blocks arranged in a $j-1^{th}$ ($j \Rightarrow 2$) line in the first direction of the $i^{th}$ ($i \Rightarrow 2$) first frame image, and the read-out control unit reads out the N blocks arranged in a j–1$^{th}$ line in the second direction of the i–1$^{th}$ second frame image in parallel, and the write-in control unit writes the N blocks arranged in a j$^{th}$ line in the first direction of the i$^{th}$ first frame image into the storage area that becomes vacant by reading out the N blocks arranged in a j–1$^{th}$ line in the second direction of the i–1$^{th}$ second frame image by the read-out control unit.

(6) The image processing apparatus according to (2) above, in which the write-in control unit writes the pixel data into the storage unit per the N block units being two or more arranged in the first direction in the first frame image, the read-out control unit reads out the N blocks written into the storage unit by the write-in control unit immediately before, and the write-in control unit writes the N blocks to be written next into the N storage areas that become vacant by reading out the N blocks by the read-out control unit immediately before.

(7) The image processing apparatus according to (6) above, in which the write-in control unit writes the N blocks arranged in a j–1$^{th}$ (j=>3) line in the first direction of the i$^{th}$ (i=>1) first frame image, and the read-out control unit reads out the N blocks arranged in a j–2$^{th}$ line in the second direction of the i$^{th}$ second frame image in parallel, and the write-in control unit writes the N blocks arranged in a j$^{th}$ line in the first direction of the i$^{th}$ first frame image into the N storage areas that become vacant by reading out the N blocks arranged in a j–2$^{th}$ line in the second direction of the i$^{th}$ second frame image by the read-out control unit.

(8) The image processing apparatus according to any of (1) to (7), in which deformation of the first frame image is at least one of rotation, reverse, enlargement, and reduction.

(9) An image processing method executed by an image processing apparatus that writes pixel data of a first frame image being each frame image of an input moving image into a predetermined plurality of storage areas in a storage unit in a predetermined write-in order, reads out in a predetermined read-out order the pixel data of the first frame image written into the storage unit, and generates a second frame image being the first frame image deformed, including:

performing the write-in of the pixel data and the read-out of the pixel data in parallel;

dividing the first frame image into blocks in 2 rows×2 columns or more;

writing the blocks into each of the storage area one by one; and writing the block to be written next into the storage area that becomes vacant by reading out the pixel data immediately before.

(10) A program for executing processing by a computer that writes pixel data of a first frame image being each frame image of an input moving image into a predetermined plurality of storage areas in a storage unit in a predetermined write-in order, reads out in a predetermined read-out order the pixel data of the first frame image written into the storage unit, and generates a second frame image being the first frame image deformed, the processing including:

performing the write-in of the pixel data and the read-out of the pixel data in parallel;

dividing the first frame image into blocks in 2 rows×2 columns or more;

writing the blocks into each of the storage area one by one; and writing the block to be written next into the storage area that becomes vacant by reading out the pixel data immediately before.

REFERENCE SIGNS LIST

1 image processing apparatus
11 write-in control unit
12 read-out control unit
13 tag control unit
14 the tag resistor
15-1 to 15-72 RAM

The invention claimed is:

1. An image processing apparatus, comprising:
a storage unit;
a write-in control unit configured to:
  write pixel data of a first frame image into a plurality of storage areas in the storage unit in a write-in order, wherein the first frame image is a frame image of an input moving image;
  divide the first frame image into blocks of at least 2 rows×2 columns; and
  write the blocks into each storage area of the plurality of storage areas one by one; and
a read-out control unit configured to:
  read out, in parallel to the write of the pixel data of the first frame image, in a read-out order the pixel data of the first frame image written into the storage unit; and
  generate a second frame image, wherein the second frame image is the first frame image that is deformed,
wherein the write-in control unit is further configured to:
write a block to be written next into a storage area of the plurality of storage areas that becomes vacant by the read out of the pixel data by the read-out control unit,
  wherein the write-in order is along a first direction of the first frame image, and the read-out order is along a second direction that is same as the first direction of the second frame image,
  wherein the write-in control unit writes N blocks arranged in a j–1$^{th}$(j=>2) line in the first direction of an i$^{th}$ (i=>2) first frame image, and the read-out control unit reads out the N blocks arranged in a j–1$^{th}$ line in the second direction of an i–1$^{th}$ second frame image in parallel, and
  wherein the write-in control unit writes the N blocks arranged in a j$^{th}$ line in the first direction of the i$^{th}$ first frame image into the storage area that becomes vacant by the read out of the N blocks arranged in the j–1$^{th}$ line in the second direction of the i–1$^{th}$ second frame image by the read-out control unit.

2. The image processing apparatus according to claim 1,
wherein the write-in control unit is further configured to write the pixel data into the storage unit per N block units that are at least two N blocks arranged in the first direction in the first frame image,
wherein the read-out control unit is further configured to read out the pixel data from the storage unit per M block units that are at least two M blocks arranged in the second direction in the second frame image, and
wherein the write-in control unit is further configured to write the N blocks to be written next into the storage area that becomes vacant by the read out the pixel data by the read-out control unit every time at least N storage areas become vacant.

3. The image processing apparatus according to claim 2, wherein N=M is satisfied, and
wherein the write-in control unit is further configured to write the N blocks to be written next into N storage areas that become vacant by read out the N blocks by the read-out control unit.

4. The image processing apparatus according to claim 1, wherein the write-in control unit is further configured to write the pixel data into the storage unit per N block units that are at least two N blocks arranged in the first direction in the first frame image,
wherein the read-out control unit is further configured to read out the N blocks written into the storage unit by the write-in control unit, and
wherein the write-in control unit is further configured to write the N blocks to be written next into N storage areas that become vacant by the read out of the N blocks by the read-out control unit.

5. The image processing apparatus according to claim 4, wherein the write-in control unit is further configured to write N blocks arranged in a j–1$^{th}$ (j=>3) line in the first direction of an i$^{th}$ (i=>1) first frame image, and the read-out control unit is further configured to read out N blocks arranged in a j–2$^{th}$ line in the second direction of an i$^{th}$ second frame image in parallel, and
wherein the write-in control unit is further configured to write N blocks arranged in a j$^{th}$ line in the first direction of the i$^{th}$ first frame image into N storage areas that become vacant by the read out the N blocks arranged in the j–2$^{th}$ line in the second direction of the i$^{th}$ second frame image by the read-out control unit.

6. The image processing apparatus according to claim 1, wherein the deformation of the first frame image is at least one of rotation, reverse, enlargement, or reduction.

7. An image processing method, comprising:
writing pixel data of a first frame image into a plurality of storage areas in a storage unit in a write-in order, wherein the first frame image is a frame image of an input moving image;
reading out, in parallel to the writing of the pixel data of the first frame image, in a read-out order the pixel data of the first frame image written into the storage unit;
generating a second frame image, wherein the second frame image is the first frame image that is deformed;
dividing the first frame image into blocks of at least 2 rows×2 columns;
writing the blocks into each storage area of the plurality of storage areas one by one;
writing a block to be written next into a storage area of the plurality of storage areas that becomes vacant by the reading out the pixel data,
wherein the write-in order is along a first direction of the first frame image, and the read-out order is along a second direction that is same as the first direction of the second frame image;
writing N blocks arranged in a j–i$^{th}$(j=>2) line in the first direction of an i$^{th}$ (i=>2) first frame image, and reading out the N blocks arranged in a j–1$^{th}$ line in the second direction of an i–1$^{th}$ second frame image in parallel; and
writing the N blocks arranged in a j$^{th}$ line in the first direction of the i$^{th}$ first frame image into the storage area that becomes vacant by the reading out of the N blocks arranged in the j–1$^{th}$ line in the second direction of the i–1$^{th}$ second frame image.

8. A non-transitory computer-readable medium having stored thereon, computer-executable instructions that, when executed by a computer, cause the computer to execute operations, the operations comprising:
writing pixel data of a first frame image into a plurality of storage areas in a storage unit in a write-in order, wherein the first frame image is a frame image of an input moving image;
reading out, in parallel to the writing of the pixel data of the first frame image, in a read-out order the pixel data of the first frame image written into the storage unit
generating a second frame image, wherein the second frame image is the first frame image that is deformed;
dividing the first frame image into blocks of at least 2 rows×2 columns;
writing the blocks into each storage area of the plurality of storage areas one by one;
writing a block to be written next into a storage area of the plurality of storage areas that becomes vacant by the reading out the pixel data,
wherein the write-in order is along a first direction of the first frame image, and the read-out order is along a second direction that is same as the first direction of the second frame image;
writing N blocks arranged in a j–1$^{th}$(j=>2) line in the first direction of an i$^{th}$ (i=>2) first frame image, and reading out the N blocks arranged in a j–1$^{th}$ line in the second direction of an i–1$^{th}$ second frame image in parallel; and
writing the N blocks arranged in a j$^{th}$ line in the first direction of the i$^{th}$ first frame image into the storage area that becomes vacant by the reading out of the N blocks arranged in the j–1$^{th}$ line in the second direction of the i–1$^{th}$ second frame image.

9. An image processing apparatus, comprising:
a storage unit;
a write-in control unit configured to:
write pixel data of a first frame image into a plurality of storage areas in the storage unit in a write-in order, wherein the first frame image is a frame image of an input moving image;
divide the first frame image into blocks of at least 2 rows×2 columns; and
write the blocks into each storage area of the plurality of storage areas one by one; and
a read-out control unit configured to:
read out, in parallel to the write of the pixel data of the first frame image, in a read-out order the pixel data of the first frame image written into the storage unit; and
generate a second frame image, wherein the second frame image is the first frame image that is deformed,
wherein the write-in control unit is further configured to write a block to be written next into a storage area of the plurality of storage areas that becomes vacant by the read out of the pixel data by the read-out control unit,
wherein the write-in order is along a first direction of the first frame image, and the read-out order is along a second direction that is same as the first direction of the second frame image,
wherein the write-in control unit writes N blocks arranged in a j–1$^{th}$ (j=>3) line in the first direction of an i$^{th}$ (i=>1) first frame image, and the read-out control unit reads out the N blocks arranged in a j−2$^{th}$ line in the second direction of an i$^{th}$ second frame image in parallel, and
wherein the write-in control unit writes the N blocks arranged in a j$^{th}$ line in the first direction of the i$^{th}$ first frame image into N storage areas that become vacant by reading out of the N blocks arranged in the j−2$^{th}$ line in the second direction of the i$^{th}$ second frame image by the read-out control unit.

* * * * *